ANALOG COMPUTATION APPARATUS FOR GENERATION OF DYNAMIC CORRECTION SIGNALS FOR CATHODE RAY TUBES

Filed Dec. 29, 1966 2 Sheets-Sheet 1

INVENTORS:
MILTON L. NOBLE,
JOSEPH W. BROUILLETTE,
BY Richard V. Lang
THEIR ATTORNEY.

INVENTORS:
MILTON L. NOBLE,
JOSEPH W. BROUILLETTE,
BY Richard V. Lang
THEIR ATTORNEY.

1

3,465,137
ANALOG COMPUTATION APPARATUS FOR GENERATION OF DYNAMIC CORRECTION SIGNALS FOR CATHODE RAY TUBES

Joseph W. Brouillette, Jr., Jamesville, and Milton L. Noble, Liverpool, N.Y., assignors to General Electric Company, a corporation of New York Filed Dec. 29, 1966, Ser. No. 605,810
Int. Cl. G06g 7/20
U.S. Cl. 235—193 10 Claims The invention relates to an apparatus for simultaneously computing a plurality of product functions from a plurality of time variant input quantities. These product functions may take the form of a product of two input quantities, a difference in the squares of the two input quantities; or a sum of the squares of the input quantities.

The invention has particular application to the computation or generation of dynamic correction signals for high resolution cathode ray tubes. In cathode ray tubes, substantially all of which have flat or flattened target surfaces, the beam spot on the target changes in focus and in shape as a function of its position on the target surface. With respect to focus, conventional electron optics produce a natural focal surface that is approximately spherical, having a center at the center of deflection of the cathode ray tube. Shaping the target surface, and thus the face of the cathode ray tube supporting it to suit this natural focal surface is impractical, and accordingly the abberation is usually tolerated in low resolution applications. As a practical matter, a number of compromises, such as adding slight curvature to the target surface, using an undersized spot and the like tend to minimize the effects while not precisely compensating for them. With respect to spot shape a somewhat similar problem arises. If the spot were projected on an optimally spherical surface, in which the surface was at all times orthogonal to the incident beam, the spot would retain the circular configuration given it in the gun and be largely independent of the instantaneous beam position. In a cathode ray tube having a flattened target surface, however, as the beam is deflected off-axis, it strikes the surface more and more obliquely and thus the spot becomes more and more elliptical (with the major axis of the ellipse being radially oriented). As in the case of focus corrections, low resolution applications ordinarily may be satisfied without the need for precise compensation.

When it is necessary to project a high resolution signal upon a cathode ray tube, then it becomes necessary both to refocus the beam as a function of its position on the target surface and to introduce an astigmatism correction as a function of the beam position on the target surface. These corrections when applied to a beam as a function of its position are known as dynamic corrections.

Since the position where the spot strikes the target measured in rectangular coordinates from the axis of the target is proportional to a corresponding set of deflection voltages (or currents) measured in the same coordinates, one may relate the focus and the astigmatism control signals to either the spot position or the deflection quantity defining the position. In the focus correction, the correction is a function of the spot distance from the center of the target. This requires a correction proportional to the sum of the squares of the position coordinates for the corresponding electrical deflection quantities. In astigmatism correction, two corrections are required, the first proportional to the simple product of the quantities and the other proportional to the difference in the squares of these quantities.

A system disclosed by K. Schlesigner and R. A. Wagner, in an article entitled "An Electron-beam Tube for Analogue Multiplication," appearing in the I.E.E.E. Transactions on Electron Devices, volume 12, Number 8, August 1965, pp. 478–84, describes an apparatus suitable for performing these functions. The fundamental component of the system is an electron-beam tube which generates an electron beam of square cross-section and of a uniform current density, which beam is deflected along orthogonal axes by a deflection system associating a particular input signal with deflection along a particular axis. The electron beam is directed toward a target comprising four metallic plates forming quadrants aligned with the orthogonal axes of the deflection system and produces a total current comprising the current sums at the plates representing first and third quadrants less the current sums at the plates representing second and fourth quadrants, which total current is proportional to the product of the input signals in a first tube. In a second tube, wherein the deflection system is rotated by a 45° angle with respect to the above-described axes, the input signals will generate a function proportional to the difference of the squares. A third function $(K(X+Y)^2)$ may be generated by obtaining deflection along a single axis maintained at a 45° angle with respect to the above-described axes in a third tube. If the product function is subtracted from the last-mentioned function, the sum of the squares function may be obtained.

2

The above-described system is of intrinsically high speed and bandwidth, and while providing sufficient speed, accuracy, and bandwidth, requires three electron-beam tubes and summing network to obtain the three focus and astigmatism corrections.

It is an object of our invention to provide an improved computation apparatus with a reduced number of components and consequent reduced cost.

Accordingly, it is another object of the present invention to provide an improved analog computation apparatus capable of simultaneously obtaining two product functions from a pair of input functions.

It is a further object of the present invention to provide an improved analog computation apparatus capable of simultaneously obtaining three product functions of two input variables including a simple product term, a difference in the squares term, and a sum of the squares term.

It is a further object of the present invention to provide an analog function generator suitable for producing a dynamic astigmatism correction for the beam of a high resolution cathode ray tube.

It is still another object of the present invention to provide an analog function generator for generating two correction quantities for achieving dynamic astigmatism correction and a third correction quantity for focus correction of the beam in a high resolution cathode ray tube.

These and other objects may be achieved in accordance with the invention in a novel analog computation apparatus comprising an electron target assembly having eight mutually insulated sectors, a gun typically producing a circular beam, having a radius of about one-half the radius of the target, and a pair of orthogonal beam deflection means, each coupled to a separate electrical input quantity, and aligned with the sector boundaries. The currents from each sector are collected in a resistance matrix where they are available quadrant by quadrant. A first subtractive means is coupled to the matrix and subtracts the currents in one pair of opposite quadrants from the currents in the alternate pair of quadrants. A second subtractive means is provided, also coupled with the resistance matrix, which performs the same current subtractive function for quadrants rotated 45°. This apparatus simultaneously derives both astigmatic correction functions.

In a further embodiment, a pair of quadraturely related components are combined with the two input quantities, the quadrature components being modulated on a carrier whose frequency is substantially higher than the upper useful components of the initial input quantities. By resort to low pass filters which eliminate the carrier terms, the astigmatism corrections may be obtained. At the same time, by means of a circuit tuned to the carrier and coupled to one or both of the subtractive means, a term may be obtained, which upon being squared and subject to further low pass filtering, will provide the focus correction quantity.

The novel and distinctive features of this invention are set forth in the claims appended to the specification. The invention itself, however, together with the further objects and advantages thereof may best be understood by reference to the following description and accompanying drawings, in which:

Figure 1:
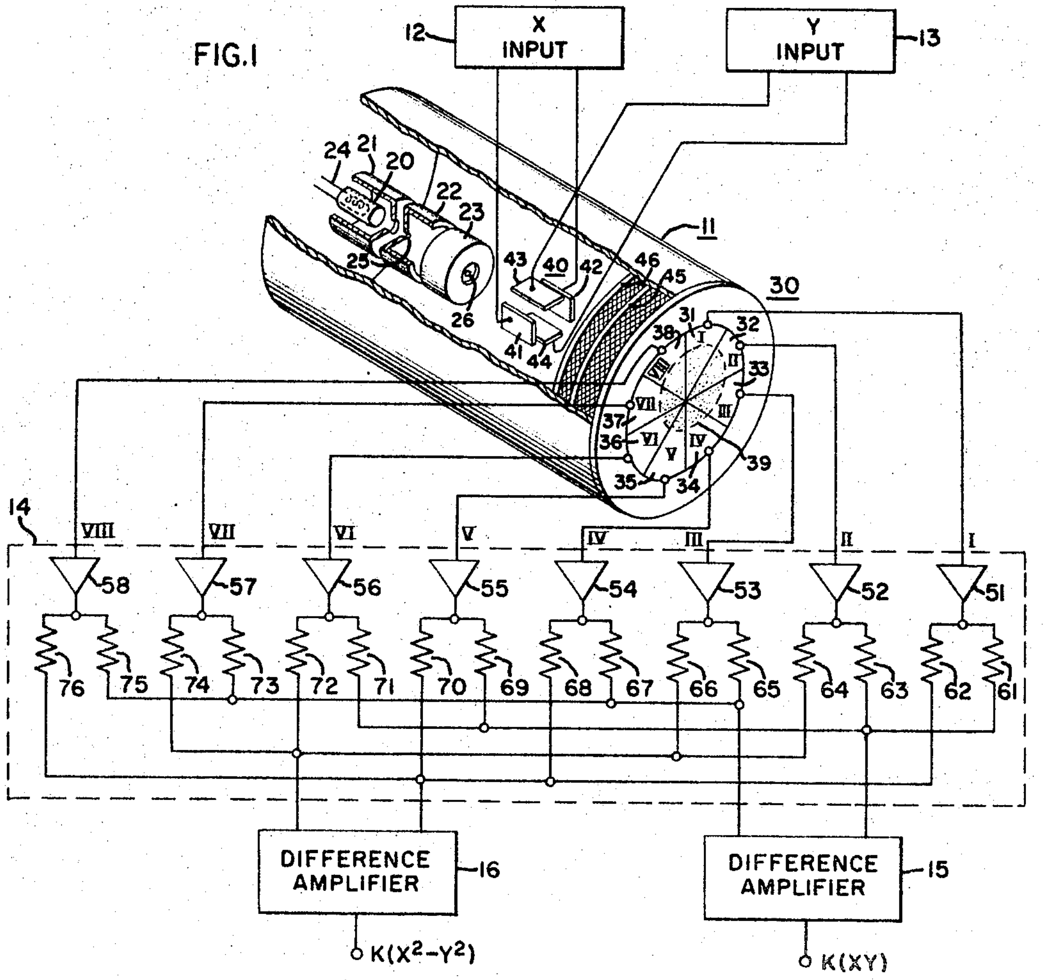
FIGURE 1 is an illustration of a first embodiment of the invention illustrating the function generator system with specific emphasis on the cathode ray tube which forms a principal component of the system and the connections to this tube for applying and deriving the functional signals.

Referring now to FIGURE 1, the first embodiment includes a cathode ray tube 11 connected in circuit with a source 12 providing a first electrical input quantity, a source 13 providing a second electrical input quantity and a complex output matrix 14, the matrix 14 being in turn coupled to a first difference amplifier 15 which derives a first output function which is a simple product of the input quantities and a second difference amplifier 16 which derives an output function equal to the difference in the squares of the electrical input functions. For clarity in the subsequent description, the first electrical input quantity will be denominated X and the second input quantity Y. Both may be expressible as time variant functions, such as the instantaneous deflection voltages applied to an electrostatically deflected high resolution cathode ray tube.

Cathode ray tube 11 may be seen to comprise a beam forming arrangement or gun consisting of elements 20, 21, 22, 23; a target assembly 30 having 8 sectors, 31 to 38 respectively, for electron collection and pair of screens 45, 46 in proximity to the target assembly; and an intermediately placed deflection system 40 including elements 41 and 42 for achieving horizontal deflection and elements 43 and 44 for achieving vertical deflection. The beam formation mechanism or gun, comprising elements 20, 21, 22 and 23, is adapted to project a relatively large beam upon the target 30, as illustrated at 39 and the deflection means 40, as will subsequently be explained in greater detail, is adapted to deflect the beam over the surface of the target. As will also subsequently be explained, the deflection quantities are the input quantities of applicant's novel function generator and the distribution of currents to the individual sectors 31 through 38 of the target are used in determining the desired output functions.

Let us now consider in somewhat greater detail the individual components of the cathode ray tube. The beam formation assembly comprises a conventional cathode ray tube. The beam formation assembly comprises a conventional cathode 20 arranged to be heated by means of a filament 24.

The cathode 20 is in turn placed within a cylindrical control grid 21 having a relatively large central aperture in the planar end wall thereof. Following the control grid 21, as one progresses from the cathode, is a first anode 22 of cylindrical configuration, having a single apertured end wall on its end adjacent the control grid 21. The aperture, which is relatively small, bears the reference numeral 25. The last electrode in the gun assembly is the second anode 23. It also is cylindrical, and has a planar end wall in the end remote from the cathode. It has a relatively large aperture. At an intermediate point along the axis of the second anode 23 a second transverse partition is provided bearing a smaller aperture 26. This aperture 26 is the limiting aperture and defines the boundaries of the projected beam.

The second anode 23 is energized by the maximum positive potential with respect to the cathode in the gun structure, and thus provides the principal accelerating fields for the electrons emitted from the cathode 20. Typically, the cathode is operated at −1000 volts, and the second anode at ground potential. The first anode is operated at an intermediate voltage, typically −750 volts, and provides lensing action in combination with the second anode assembly. The control grid 21 operates usually with less than 100 volts positive potential relative to the cathode, and is used primarily for adjusting the beam current to the desired level.

By virtue of the foregoing structure provisions and energization, the gun has a first aperture 25 providing a diverging beam with a fairly uniform density near the axis of the tube. The lensing effect of first and second anodes 22 and 23 respectively tends to bring the central portion of the beam to a less diverging condition, and as the beam passes through the aperture 26, the margin of the beam is defined by the periphery of the aperture 26, and is projected ultimately upon the target 30 generally is the size and configuration illustrated at 39.

The target assembly 30 consists of the sectored target composed of sectors 31 through 38; a pair of isolation and secondary emission suppression screens 45 and 46 in close proximity to the target sectors. The screen 45 is operated at a substantial negative potential, typically −500 volts, to reflect secondary electrons back to the target. The screen 46 is operated at ground potential and provides a field-free region between the screen 46 and the second anode 23. The deflection assembly 40 operates within this field-free region.

The sectored anode is a planar member segmented into eight equal sized and mutually insulated sectors I–VIII. These sectors embrace a central angle of 45° and are provided with separate output connections as indicated by the reference numerals 31 through 38. Assuming the orientations illustrated in FIGURE 1, the line defining the boundary between sector I and sector VIII and an extension of this line, which forms the boundary between sectors IV and V, is vertical. The boundary between sectors II and III and that between sectors VI and VII, which also are on a common line, are horizontal. Similarly, the boundary between sectors I–II, III–IV, V–VI, and VII–VIII respectively, are at intermediate oblique angles, listed in clockwise sequence as viewed in FIGURE 1. The angular orientation of the sectors, particularly with respect to the deflection assembly, is critical to the proper functioning of the device, as will subsequently be explained.

The third electrical portion of the cathode ray tube 11 is a deflector assembly 40. The deflector assembly is arranged to operate in the region between the second anode 23 and the screen electrode 46. By virtue of the common connection of these electrodes to ground potential, the region is relatively free of axial fields. The first pair of deflection electrodes 41 and 42 occupy sectors horizontally to the left and to the right, respectively, of the beam and are connected to the source 12 of deflection potentials. The source 12 is preferably balanced with respect to ground potentials, and the application of an input potential creates a transverse field between the electrodes 41 and 42. This field, which is horizontal, deflects the beam to the right or to the left of a central position on the target assembly 30, and these electrodes 41 and 42 provide the horizontal or X deflection as implied by the rotation on 12.

Orthogonally to the horizontal deflection electrodes 41 and 42 are a second pair of vertical deflection electrodes 43 and 44 also connected to a source 13 of deflection potentials. The source 13 is also referenced to ground, and applies a vertical field transverse to the beam and tends to raise or lower the beam on the target 30. This will be referred to as a Y deflection. As will subsequently be explained, the X fields applied between horizontal deflection electrodes 41 and 42 must be closely aligned parallel to the boundaries between the sectors II–III and VI–VII and the Y fields applied between vertical deflection electrodes 43 and 44 must be closely aligned parallel to the boundaries between sectors I–VIII and V–VI, respectively.

Eight connections taken from the sectored target assembly 30 are applied to eight separate input terminals on the output matrix 14. The output matrix 14 has four output connections to the difference amplifiers 15 and 16. The output matrix 14 consists of a series 51 through 58, respectively, of buffer amplifiers each having their input connections coupled respectively to the terminals 31 through 38 respective of the sectored target assembly. Each buffer amplifier may take the form of an emitter follower transistor amplifier having the typical high input impedance and a low output impedance of increased current capacity. The outputs of each of the buffer amplifiers 51 through 58 are coupled respectively to a pair of equal valued, current dividing insolating resistances 61–62, 63–64, 65–66, 67–68, 69–70, 71–72, 73–74, 75–76, respectively. The remaining ends of the resistors 65, 67, 73 and 75 are connected together and to a common output lead which is coupled to a first input terminal of the difference amplifier 15. The remaining ends of resistors 61, 63, 69 and 71 are coupled to a common lead, which is coupled to the other input terminal to the difference amplifier 15. By this mode of connection, the difference amplifier 15 is connected to all eight sectors of the target assembly and produces an electrical output quantity of the following general nature:

$$[Q_{III}+Q_{IV}+Q_{VII}+Q_{VIII}]-[Q_I+Q_{II}+Q_V+Q_{VI}] \quad (1)$$

assuming Q to be the current in each sector bearing the appropriate subscript.

Similarly, the amplifier 16 is coupled to all eight sectors I–VIII in a similar manner. The remaining ends of 62, 68, 70 and 76 are coupled to a common lead and fed to one input terminal of the difference amplifier 16. The remaining ends of resistances 64, 66, 72 and 74 are coupled to a common lead and fed to the other input terminal of the difference amplifier 16. Thus the difference amplifier 16 is connected to respond to the electrical quantities in all sectors to produce an electrical output quantity of the following general nature:

$$[Q_I+Q_{II}+Q_V+Q_{VI}]-[Q_{III}+Q_{IV}+Q_{VII}+Q_{VIII}] \quad (2)$$

The difference amplifiers 15 and 16 are of conventional form, being compatible with the current mode logic employed in the matrix 14. The difference amplifiers 15 and 16 are selected to have a bandwidth compatible with the bandwidths of the applied input X and Y signals, and the desired outputs formed therefrom. The difference amplifiers have a linearity compatible with the desired accuracy with which the difference operation is to be performed. In consequence of their performing this difference function, the output quantity of the difference amplifier 15 is a product, e.g., $K_1(XY)$ where $K_1$ is a proportionality constant and the difference amplifier 16 yields an output quantity equal to the difference in the squares of the input quantities—e.g., $K_2(X^2-Y^2)$. In view of operation on a common electron beam subject to a common control grid control and symmetry in the X and Y deflection assemblies, the quantities $K_1$ and $K_2$ are substantially identical. Thus, means have been provided for obtaining both signals for correcting astigmatism in a high resolution cathode ray tube.

Figure 2:
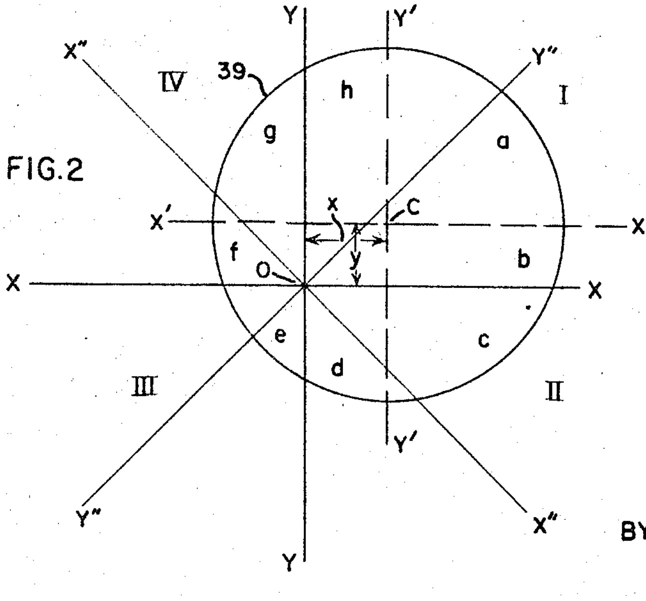
FIGURE 2 represents a trace of the electron beam on the target of the tube and is a graphical aid in explanation of the current distribution over the target.

A proof may proceed in the following manner. Assuming a linear current addition by the matrix 14 as the various resistances 61–76 are joined in groups of 4 to a common output bus and connected to the input terminals of the difference amplifier 15, it may be seen that the difference amplifier output $I_D$ may be:

$$I_D=[Q_I+Q_{II}+Q_V+Q_{VI}]-[Q_{III}+Q_{IV}+Q_{VII}+Q_{VIII}] \quad (3)$$

$$I_D=[I_I+I_{III}]-[I_{II}+I_{IV}] \quad (4)$$

where I are currents reassigned in full quadrants, the subscripts I through IV being assigned in conventional clockwise order to the respective geometric quadrants, as indicated in FIGURE 2. (The second difference amplifier 16 also responds to a corresponding four quadrant quantity wherein the axes of the quadrants have been rotated 45° with respect to reference orientation.)

Referring to FIGURE 2, the circular trace of the beam is shown at 39. It is assumed that the electron beam is of even current density on all elemental areas within the trace 39 and that a portion falls on each of sectors I, II, III and IV as illustrated. X—X is the horizontal axis and Y—Y the vertical axis of the target assembly, which in turn is referenced to the deflection electrode orientations; O is the center of the target assembly, and C is the center of the deflected beam, having the coordinates X and Y respectively. The axes passing through the center of the shifted trace 39, and parallel to the corresponding original axes are X′—X′ and Y′—Y′ respectively in FIGURE 2.

Utilizing the foregoing sets of axes to define areas within the circular trace, we have the following identity:

$$I_D=K[(a+b+h+XY)+e]-K[(c+d)+(f+g)] \quad (5)$$

where the letters correspond to areas marked in FIGURE 2, and K is a proportionality constant.

Since the circle is centrosymmetric, the first quadrant area of the circular trace 39 equals the diagonal third quadrant area. Therefore:

$$a=d+e+f+XY \quad (6)$$

similarly the areas on either side of the vertical axis Y′—Y′ and bounded between the horizontal axes X′—X′ and X—X are equal; and similarly for areas on either side of X′—X′:

$$b=f+XY \quad (7)$$

$$c=d+e \quad (8)$$

$$g=e+f \quad (9)$$

$$h=d+XY \quad (10)$$

Substituting now into Equation 5, we find:

$$I_D=K[(d+e+f-XY+f+XY+d+XY+XY+e]-K[(d+e)+d+f+(e+f)] \quad (11)$$

clearing:

$$I_D=K[4XY] \quad (12)$$

From these considerations, the current I derived from the difference amplifier 15 is shown to be proportional to the product of X and Y, the electrical quantities producing the horizontal and vertical deflections in the cathode ray tube 11.

By a similar argument, wherein the X—X and Y—Y axes are rotated 45°, the output quantity of the second difference amplifier may be obtained:

$$I'_D=[Q_I+Q_{IV}+Q_V+Q_{VIII}]-[Q_{II}+Q_{III}+Q_{VI}+Q_{VII}] \quad (13)$$

and $$I'_D=[I'_I+I'_{III}]-[I'_{II}+I'_{IV}] \quad (14)$$

where the primes designate axes shifted 45° and the I quantities are now identified by quadrants.

Utilizing the same reasoning as before, and transforming the central coordinate X, Y of the trace 39 to the shifted axes X″—X″ and Y″—Y″, it may be shown that:

$$I'_D=K(X^2-Y^2) \quad (15)$$

where the constant K is normally of the same value as that assigned in expression 12, with the quantities X and Y being the input deflection quantities.

The output functions 12 and 15 are obtained irrespective of whether the beam trace 39 is a circle or a square or a regular polygon of 4N sides, assuming in the case of the polygons, that the vertices are in alignment with at least four of the eight target sector boundaries. The general centrosymmetric requirement is that the trace 39 have reflection symmetry about each of the two sets of mutually orthogonal axes, the first set being shifted 45° from the other and both sets being referenced to the sector boundaries.

The simple circular or square configurations are preferable. The circular beam has the advantage of simplest formation and the greatest uniformity of current density since the beam formation optics are typically of circular or cylindrical configuration. The perimeter is of constant angular deflection, minimum for the area covered. The square beam configuration has the advantage of still retaining considerable fabrication simplicity, while gaining the additional advantage that any error introduced by finite spacing between sectors is inherently removed. In the interests of an optimum signal-to-noise ratio the diameter of the circular 39, when a circular trace is used, should be approximately half that of the usable target surface.

Figure 3:
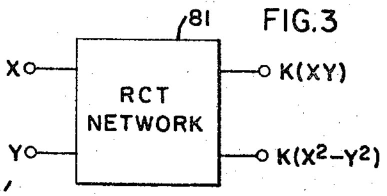
FIGURE 3 is a simplified block diagram symbolizing the arrangement in FIGURE 1 and the significant input and output signals. Here two simple input signals are applied and a product output function and a difference in the squares output functions are simultaneously derived.

The arrangement in FIGURE 1 may be symbolized in a simple block diagram form in the manner illustrated in FIGURE 3, it being assumed that the block 81 denoted "RCT network" (roving circle tube network) includes the cathode ray tube 11, the resistance matrix 14, and the differential amplifiers 15 and 16. In FIGURE 2, the illustrated input quantities to component 81 are the electrical quantities X and Y, and the output quantities K(XY) and $K(X^2-Y^2)$ at the separate output terminals, as illustrated. These two output quantities may be used to provide the dynamic astigmatism correction in a high resolution cathode ray tube.

Figures 4, 5, 6, 7:
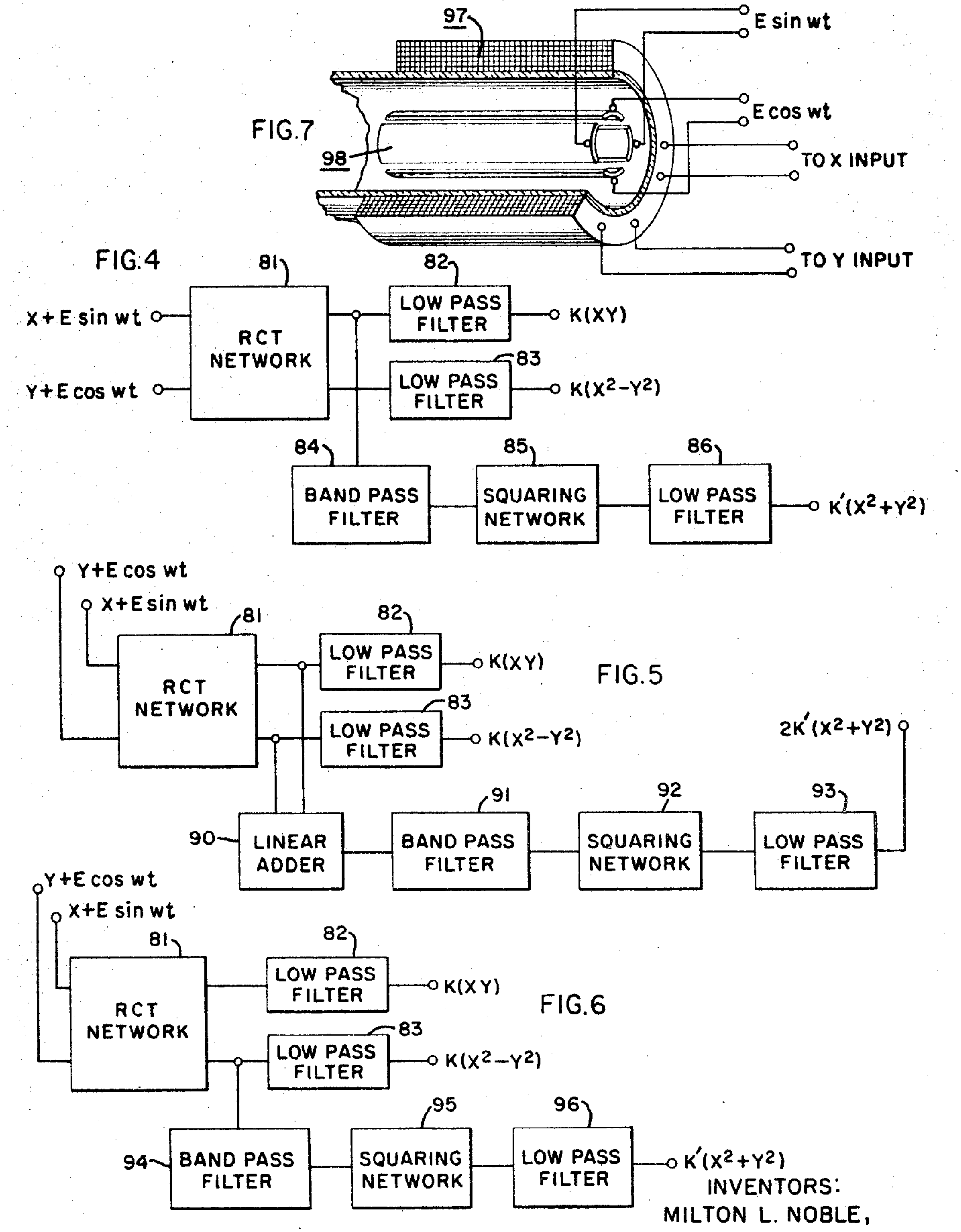
FIGURE 4 is a second block diagram wherein each input quantity has an additional component on an alternating carrier in phase quadrature with a corresponding component with the other input quantity. The output functions simultaneously derived are respectively a product function, a difference in the squares function, and a sum of the squares function.
FIGURE 5 is a second variation of the configuration of FIGURE 4, also having two composite input signals and also providing three output functions. The arrangement in FIGURE 5 is characterized by a somewhat higher output for the sum of the squares term.
FIGURE 6 is a third variation wherein two composite input quantities are applied and all three output functions are obtained.
FIGURE 7 is a deflection arrangement in the cathode ray tube having separate electromagnetic and electrostatic deflection means.

In accordance with a further aspect of the invention, a third function, namely $K'(X^2+Y^2)$ which is needed for dynamic focusing correction may also be provided from the foregoing network 81, provided that the input quantities are modified to contain additional terms. FIGURE 4 illustrates such an arrangement in a block diagram using the conventions of FIGURE 3. The over-all combination includes a roving circle tube network 81, a first and second low pass filter network, 82 and 83 respectively, a band pass filter 84, a squaring circuit 85, and a low pass filter 86.

In FIGURE 4, the quantity $(X+E \sin wt)$ and the quantity $(Y+E \cos wt)$ are applied respectively to the separate input terminals of the RCT network 81. The added terms are thus in mutual quadrature upon a common carrier. From a consideration of the mathematical properties of RCT network 81, the following output quantity appears at the product output terminal:

$$2XY+2E(X \cos wt+Y \sin wt)+E^2 \sin 2wt \quad (16)$$

The quantity 16 contains the product XY as before, together with a second term modulated on a carrier of frequency $(wt)$ and a third term modulated on a carrier at twice the carrier frequency $(2wt)$.

The filters 82, 83 and 84 facilitate selection of the separate output quantities. The low pass filter 82 is coupled to the product output terminal of RCT network 81, and has a low pass characteristic which prevents transmission of both modulated terms. It provides the product quantity K(XY).

At the difference in the squares output terminal, the following output quantity appears:

$$(X^2-Y^2)-2E(X \sin wt-Y \cos wt)-E^2 \cos 2wt \quad (17)$$

This quantity also consists of three terms; the difference in the squares terms $(X^2-Y^2)$, a second term modulated on a carrier of frequency $(wt)$, and a third term modulated on a carrier of double frequency $(2wt)$. The low pass filter 83 is coupled to the second output terminal of RCT network 81 and has a low pass characteristic selected to pass only the initial term and reject the second and third terms.

Obtaining the $K(X^2+Y^2)$ term in the FIGURE 4 embodiment is achieved through the use of the components 84, 85, and 86 which are serially connected to the product output terminal of RCT network 81. Component 84 is a band pass filter tuned to transmit the $(wt)$ frequency terms only. Thus, a quantity corresponding to the second term in expression 16 is obtained at the output of the band pass filter 84:

$$2E(X \cos wt+Y \sin wt) \quad (18)$$

This quantity derived from the filter 84 is then applied to the squaring circuit 85, which produces a new electrical quantity:

$$4E^2[X^2 \cos^2 wt+2XY \sin wt \cos wt+Y^2 \sin^2 wt] \quad (19)$$

Simplifying, we obtain:

$$4E^2\left[X^2\frac{(1+\cos 2wt)}{2}+2XY \sin wt \cos wt+Y^2\frac{(1-\cos 2wt)}{2}\right] \quad (20)$$

and finally:

$$4E^2\left[\frac{X^2+Y^2}{2}+\left(\frac{X^2-Y^2}{2}\right)\cos 2wt+XY \sin 2wt\right] \quad (21)$$

The expression 21 contains the low frequency term $(X^2+Y^2)$, which is separated from the modulated terms by the low pass filter 86, coupled to the output of the squaring network 85. This produces the desired sum of the squares term:

$$2E(X^2+Y^2)=K^1(X^2+Y^2) \quad (22)$$

In order to achieve the indicated separation of the carrier terms from the low frequency terms, the carrier frequency of the quadrature terms should be substantially higher than the upper Fourier components of the X and Y terms. The frequency separation should be compatible with available filtering technique. To be more specific, one needs to consider a specific application. In providing the astigmatism correction for a high resolution cathode ray tube, the Y quantity which corresponds to a vertical deflection may generally have fundamentals of from a few cycles to a hundred per second. Accordingly, the networks which transmit the Y signal should have a band pass capability of approximately 10 times this quantity. The horizontal deflection quantity, the X quantity, on the other hand, may have fundamentals measured in kilocycles, typically 15, and the bandwidth capabilities of the networks handling it should be typically 150 kilocycles. With these assumptions, the carrier frequency for deriving the sum of the squares term for focus adjustment should be on a carrier of typically 900 kilocycles, corresponding to a carrier at about four times the highest component of the fundamental Y quantities. The low pass filters 82, 83, and 86 may have a 12 db per octave characteristic and be formed either of LC components, or where space or weight is at a premium, of active RC networks. The band pass filter 84 must have a center frequency tuned to the 900 kc. carrier and a bandwidth capable of passing the essential signal components modulated on the carrier, while at the same time rejecting the XY term. The squaring network 85 is of conventional design, and may be of the semiconductor diode configuration, which is now common.

The arrangement illustrated in FIGURE 4 is one of several variations that one may use to obtain a sum of the squares output term. FIGURES 5 and 6 show the additional variations. The FIGURE 5 arrangement contains an RCT network 81 (as in FIGURE 4) and low pass filters 82 and 83 (as in FIGURE 4) for selecting the product term (KXY) and the difference in the square term ($K(X^2-Y^2)$). This is also true with respect to the similarly numbered components illustrated in FIGURE 6.

The derivation of the sum of the squares term $K'(X^2+Y^2)$ differs in each of FIGURES 4, 5, and 6. In FIGURE 5, a linear adder network 90 is introduced connected to both output terminals of the RCT network 81. This element sums the product terms appearing in the RCT network output. A band pass filter 91 is connected to the output of the linear adder 90. The filter is tuned to the carrier frequency (*wt*) to select the *wt* terms. The output of the band pass filter is in turn connected to the squaring network 92, which produces a sums of squares term not on a carrier. The components 91, 92, and 93 may be of the same nature as the corresponding components 84, 85, and 86 of FIGURE 4. The linear adder 90 may be a summing resistance network suitably coupled to a transistor amplifier. Reference to Equations 16 and 17, will show that adding the (*wt*) terms increases the coefficient of the sum of the squares term by a $\sqrt{2}$ factor. After squaring in the squaring network 92, the coefficient is doubled leading to an enhanced signal-to-noise ratio in the production of this sum of the squares term.

The arrangement in FIGURE 6 employs a band pass filter 94 coupled to the difference in the squares terminal of the RCT network 81 and also includes a squaring network 95 and a low pass filter 96 for achieving a final selection of the sum of the squares term. The band pass filter 94 may be of the same general nature as the band pass filters 84 and 90 and the squaring network and low pass filters may take the same form as their counterparts in FIGURES 4 and 5.

In each of the arrangements illustrated in FIGURES 4, 5, and 6 the input electrical quantities applied to each deflection means include a low frequency term (X or Y) and a higher frequency term ($E \sin wt$ or $E \cos wt$). Since the *wt* terms are ordinarily substantially higher in frequency than the X or the Y terms, it is normally required that these terms be applied with electrostatic deflection means. The X and Y terms, however, depending upon the practical application, may be either electrostatically or electromagnetically applied. In certain practical applications, a convenient way to obtain the desired composite deflection of the beam is to have a separate electrostatic means coupled to the *wt* sources and separate electromagnetic means coupled to sources of the low frequency X and Y signals, as illustrated in FIGURE 7. The electromagnetic deflection yoke 97 may be of conventional form, which slips over the envelope of a cathode ray tube and produces the conventional orthogonal deflection fields. The electrostatic deflection plates 98, when such electromagnetic deflection means are employed, should be selected to produce a minimum disturbance of the magnetic deflection fields. This may be achieved through the use of non-magnetic materials for the deflection plates. They may be supported upon a cylindrical insulating surface, and consist of four electrically separate, evaporated conductive surfaces suitably oriented to produce the orthogonal deflections.

The invention may be applied to both the dynamic correction of display and camera devices. The product functions are often in demand for general computation purposes, and thus the invention is of quite general application.

Although the invention has been described with respect to certain specific embodiments, it will be appreciated that various modifications and changes may be made by those skilled in the art without departing from the spirit and scope of the invention.

What is claimed as new and desired to be secured by Letters Patent in the United States is:

1. An analog computation apparatus comprising:

(a) an electron target assembly having eight mutually insulated sectors each having equal central angles;

(b) an electron gun for producing a beam of centrosymmetric cross-section and of uniform current density throughout, arranged to produce a spot on said target, embracing a substantial portion thereof;

(c) a first beam deflection means having terminals for application of a first electrical input quantity, aligned to deflect said beam parallel to the boundary between sectors I and VIII and the boundary between IV and V where the sector numerals are assigned in consecutive order;

(d) a second beam deflection means having terminals for application of a second electrical input quantity aligned to produce a deflection orthogonal to that of said first beam deflection means;

(e) a first subtractive means coupled to each of said sectors to obtain an electrical quantity:

$$[Q_{I}+Q_{II}+Q_{V}+Q_{VI}]-[Q_{III}+Q_{IV}+Q_{VII}+Q_{VIII}]$$

where said Q quantities are currents flowing into said correspondingly numbered sectors for producing an output quantity proportional to the product of said first and second input quantities; and (f) a second subtractive means coupled to each of said sectors to obtain an electrical quantity equal to:

$$[Q_{I}+Q_{IV}+Q_{V}+Q_{VIII}]-[Q_{II}+Q_{III}+Q_{VI}+Q_{VII}]$$

for producing an output quantity proportional to the difference in the squares of said input quantities.

2. An analog computation apparatus as set forth in claim 1 wherein said electron gun produces a circular beam.

3. An analog computation apparatus as set forth in claim 1 wherein said electron gun produces a circular beam having a radius of about half the radius of said target.

4. An analog computation apparatus as set forth in claim 1 wherein said electron gun produces a square beam.

5. An analog computation apparatus as set forth in claim 1 wherein eight buffer amplifiers are provided, each having a pair of electrically independent outputs, one connected to said first and the other to said second difference means.

6. An analog computation apparatus as set forth in claim 1 wherein said first electrical input quantity has two components:

$$X+E \sin wt$$

and said second electrical quantity has two components:

$$Y+E \cos wt$$

($wt$) defining a carrier whose frequency exceeds the Fourier components of said X and Y terms;

wherein filtering means are provided coupled to the output of said first and second subtractive means respectively to eliminate said ($wt$) terms from the product and difference in the squares output quantities; and wherein means are provided coupled to the output of at least one of said subtractive means tuned to select said ($wt$) terms, squaring means for squaring said selected terms to obtain a quantity containing the sum of the squares of said respective first and second input quantities, and filter means for selecting said sum of the squares term.

7. An analog computation apparatus as set forth in claim 6 wherein said means tuned to select said ($wt$) terms is coupled to the output of said first subtractive means.

8. An analog computation apparatus as set forth in claim 6 wherein said means tuned to select said ($wt$) terms is coupled to the output of said second subtractive means.

9. An analog computation apparatus as set forth in claim 6 wherein linear addition means are provided, and wherein said means tuned to select said ($wt$) terms is coupled to both subtractive means through said linear addition means.

10. An analog computation apparatus as set forth in claim 6 wherein electrostatic deflection means are provided for applying said ($wt$) deflections and electromagnetic deflection means are provided for said X and Y deflections.

References Cited

UNITED STATES PATENTS

| | | | |
|---|---|---|---|
| 2,994,779 | 8/1961 | Brouillette | 235—193 X |
| 3,037,123 | 5/1962 | Lewis et al. | 235—198 X |
| 3,044,058 | 7/1962 | Harris. | |
| 3,092,751 | 6/1963 | Clark. | |

MALCOLM A. MORRISON, Primary Examiner

J. F. RUGGIERO, Assistant Examiner

U.S. Cl. X.R.

235—198; 315—24